(12) United States Patent
Inoue et al.

(10) Patent No.: US 9,646,785 B2
(45) Date of Patent: May 9, 2017

(54) VACUUM MONITORING DEVICE (71) Applicant: Mitsubishi Electric Corporation, Chiyoda-ku (JP)

(72) Inventors: Naoaki Inoue, Chiyoda-ku (JP); Junichi Abe, Chiyoda-ku (JP); Tomoko Tanabe, Chiyoda-ku (JP); Tomotaka Yano, Chiyoda-ku (JP); Satoru Yoshida, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 174 days.

(21) Appl. No.: 14/434,296

(22) PCT Filed: Nov. 27, 2013

(86) PCT No.: PCT/JP2013/081855
§ 371 (c)(1),
(2) Date: Apr. 8, 2015

(87) PCT Pub. No.: WO2014/091926
PCT Pub. Date: Jun. 19, 2014

(65) Prior Publication Data
US 2015/0270080 A1 Sep. 24, 2015

(30) Foreign Application Priority Data
Dec. 12, 2012 (JP) ................... 2012-270924

(51) Int. Cl.
*G01R 27/08* (2006.01)
*G01N 19/08* (2006.01)
(Continued)

(52) U.S. Cl.
CPC .......... *H01H 33/668* (2013.01); *H01H 33/26* (2013.01); *H02B 13/065* (2013.01)

(58) Field of Classification Search
CPC ............ G01R 31/3274; G01R 31/2601; G01R 31/3275; G01R 31/26; G01R 31/12;
(Continued)

(56) References Cited

U.S. PATENT DOCUMENTS 6,850,399 B1    2/2005  Kato et al.
7,141,990 B2 *  11/2006  Bast ....................... G01N 3/066
                                                            324/708

(Continued)

FOREIGN PATENT DOCUMENTS

JP       09-121409       5/1997
JP       2002 71743      3/2002
(Continued)

OTHER PUBLICATIONS

International Search Report issued on Jan. 14, 2014 in PCT/JP13/81855 filed Nov. 27, 2013.

*Primary Examiner* — Patrick Assouad
*Assistant Examiner* — Taqi Nasir
(74) *Attorney, Agent, or Firm* — Oblon, McClelland, Maier & Neustadt, L.L.P.

(57) ABSTRACT

A vacuum monitoring device of a vacuum circuit breaker with a line of a vacuum valve led out to the external of a metal tank through a bushing having a shield working as a low-pass filter, includes: a first antenna; a second antenna; a first and a second detection portion measuring intensity of an electromagnetic wave detected by the antennas; and a determination portion determining a vacuum deterioration of the circuit breaker by comparing the intensity of the electromagnetic wave detected by the first and the second detection portions, wherein the first and second detection portion include frequency filters passing a frequency band, of elec- (Continued)

tromagnetic waves resulting from discharges occurring when the vacuum valve deteriorates in vacuum, which is attenuated by the shield.

8 Claims, 6 Drawing Sheets

(51) Int. Cl.
    *H01H 33/668* (2006.01)
    *H01H 33/26* (2006.01)
    *H02B 13/065* (2006.01)

(58) Field of Classification Search
    CPC ............ G01R 31/2607; G01R 31/2621; G01R 31/3272; G01R 31/3333; G01R 19/0092; G01R 19/16576; G01R 1/0416; G01R 1/07342; G01R 31/1254; G01R 31/2608
    USPC ..... 324/415–424, 762.01, 71.5, 750.12, 144, 324/331, 463, 228, 232, 260, 263, 754.29, 324/500–537
    See application file for complete search history.

(56) References Cited

U.S. PATENT DOCUMENTS

| 7,170,297 | B1 * | 1/2007 | Dunsmore | G01R 27/28 324/534 |
|---|---|---|---|---|
| 7,459,916 | B2 * | 12/2008 | Crain | G01R 31/001 324/240 |
| 7,750,643 | B2 * | 7/2010 | Rose | G01N 19/08 324/525 |
| 2002/0024341 | A1 | 2/2002 | Rokunohe et al. | |
| 2003/0112569 | A1 | 6/2003 | Kato et al. | |
| 2003/0173969 | A1 | 9/2003 | Sakaki et al. | |
| 2005/0135028 | A1 | 6/2005 | Kato et al. | |
| 2005/0135029 | A1 | 6/2005 | Kato et al. | |

FOREIGN PATENT DOCUMENTS

| JP | 2002 184275 | 6/2002 | |
| JP | WO 2012157138 A1 * | 11/2012 | ............ H01H 33/26 |
| WO | 01 65653 | 9/2001 | |

* cited by examiner

VACUUM MONITORING DEVICE

TECHNICAL FIELD

The present invention relates to a vacuum monitoring device of a vacuum circuit breaker.

BACKGROUND ART

A gas circuit breaker enables a break by utilizing the superior insulation performance and break performance of an SF6 gas, but as the SF6 gas has a high global warming potential, a circuit breaker with a low environmental burden is demanded. Meanwhile, a vacuum circuit breaker enables a large current break owing to the superior insulation performance and break performance in a high vacuum. Also, as the vacuum circuit breaker does not use the SF6 gas and has a low environmental burden, the application of the vacuum circuit breaker to a high voltage is progressing.

Herein, in the case of the gas circuit breaker, a gas pressure is monitored by a manometer, and when the gas pressure falls below a gas pressure necessary for the insulation and break due to a gas leak, an anomaly signal is emitted, and the operation of the gas circuit breaker is locked. Meanwhile, in the case of the vacuum circuit breaker too, as the insulation and break performance cannot be maintained when a vacuum deterioration occurs due to a crack in a vacuum vessel, or the like, the method of monitoring the degree of vacuum is required.

As one technique of monitoring the degree of vacuum of the vacuum circuit breaker in a non-contact way, there is a method whereby an electromagnetic wave of a partial discharge occurring in the vacuum vessel when a vacuum deterioration occurs is detected by an antenna. The technique itself of detecting the electromagnetic wave of the partial discharge with the antenna is also commonly used in a gas insulated switchgear using an SF6 gas, and in the gas insulated switchgear, a high frequency component of a discharge of on the order of 500 MHz to 1500 MHz is detected. Meanwhile, it is known that the frequency of a partial discharge in a low vacuum is low compared with the heretofore described. In PTL 1, a vacuum deterioration is determined by detecting a signal component of 20 to 100 MHz of a discharge electromagnetic wave in a low vacuum when there is a vacuum deterioration.

CITATION LIST

Patent Literature

PTL 1: JP-A-2002-184275
PTL 2: JP-A-9-121409
PTL 3: WO2001/065653
PTL 4: JP-A-2002-71743

SUMMARY OF INVENTION

Technical Problem

A signal component of 20 to 100 MHz of a discharge electromagnetic wave is detected in PTL 1, as heretofore described, but as this frequency band is the frequency band of a broadcast wave of an FM broadcast, a television, or the like, there is a possibility that a vacuum monitoring device malfunctions due to being affected by an exogenous noise resulting from a broadcast wave. Also, as the vacuum circuit breaker is connected to another instrument, such as a transformer, via a power line, there is also a case in which the vacuum circuit breaker is affected by a conduction noise from the other instrument.

Meanwhile, PTL 2 is an example of monitoring a partial discharge of a gas insulated switchgear, and an electromagnetic wave of an in-tank discharge leaking from an insulating spacer of the gas insulated switchgear is detected by an antenna 1 mounted out of a tank. An electromagnetic wave is also detected by an antenna 2 mounted in a position spaced from an insulating spacer out of the tank, and by taking the difference between signals detected by the antenna 1 and antenna 2, the component of an exogenous noise from a broadcast wave or the like is removed, thus evaluating only a signal of an in-tank discharge. However, there is a disadvantage that the detection of an in-tank discharge by the out-tank antenna leads to a deterioration in detection sensitivity.

The invention aims to obtain a highly reliable vacuum monitoring device, of a metal tank type vacuum circuit breaker with a vacuum valve incorporated therein, which can detect a vacuum deterioration of the vacuum valve.

Solution to Problem

A vacuum monitoring device according to the invention is a vacuum monitoring device, which monitors a vacuum deterioration of a vacuum valve, of a metal tank type vacuum circuit breaker which includes the vacuum valve inside a metal tank and has a connecting line of the vacuum valve led out to the external of the metal tank through a bushing, the bushing having an internal shield having a low-pass function, the device including a first antenna installed inside the metal tank; a second antenna installed outside the metal tank; a first detection portion which measures the intensity of an electromagnetic wave, resulting from a partial discharge of the vacuum valve, which is detected by the first antenna; a second detection portion which measures the intensity of an electromagnetic wave, resulting from a noise out of the metal tank, which is detected by the second antenna; and a determination portion which determines a vacuum deterioration of the vacuum valve by comparing the intensity of the electromagnetic wave detected by the first detection portion and the intensity of the electromagnetic wave detected by the second detection portion, wherein the first and second detection portions include frequency filters which pass a frequency band, of electromagnetic waves resulting from discharges occurring when the vacuum valve deteriorates in vacuum, which is attenuated by the internal shield.

Advantageous Effects of Invention

According to the invention, as it does not happen that the detection of a partial discharge of the vacuum interrupter installed in the metal tank is impeded by a noise out of the metal tank, it is possible to enhance the reliability of monitoring a vacuum deterioration of the vacuum interrupter.

DESCRIPTION OF EMBODIMENTS

Embodiment 1

Firstly, a description will be given, using FIGS. 1 to 3, of a configuration of a vacuum circuit breaker including a vacuum monitoring device according to a first embodiment of the invention. A vacuum circuit breaker 15 includes a metal tank 12. The main circuit of the vacuum circuit breaker 15 is formed of a vacuum valve 9 installed in the metal tank 12, a pair of bushings 4 led out from the metal tank 12, a porcelain tube 3, fixed to the metal tank 12, which houses the bushing 4, and an in-porcelain-tube conductor 2 which connects a connecting line of the vacuum valve 9 to a power line 1 via an in-bushing conductor 4a connected to the power line 1.

The bushing 4 is formed of the in-bushing conductor 4a, an insulator 4c enclosing the in-bushing conductor 4a, and an internal shield 4b formed of a cylindrical metal conductor provided in the insulator 4c, and the internal shield 4b is connected to a ground 13 through, for example, the metal tank 12. The bushing 4, owing to the presence of the internal shield 4b, functions as a low-pass filter through which a high frequency component equal to or higher than a specific frequency is difficult to pass (for example, herein, 100 MHz or less is passed).

The vacuum interrupter 9 includes a pair of contacts 9a and 9b connected to the in-bushing conductor 4a. The vacuum circuit breaker 15 has an operation mechanism which operates the opening and closing of the contacts 9a and 9b, but herein, the illustration of the operation mechanism is omitted.

A first antenna (hereafter referred to also as an in-tank antenna) 5 is further installed in the metal tank 12, and an output 7 of the first antenna 5 is supplied to a vacuum monitoring section 8 to be described hereafter. Also, a second antenna (hereafter referred to also as an out-tank antenna) 6 is installed out of the metal tank 12 and above the metal tank 12, for example, between two porcelain tubes 3, and the output of the second antenna is connected to the vacuum monitoring section 8. The frequency of electromagnetic waves detected by the in-tank antenna 5 and out-tank antenna 6 is set to fall in a frequency band (herein, 200 to 300 MHz) which is difficult to pass through the low-pass filter of the bushing 4, and the in-tank antenna 5 and the out-tank antenna 6 are shaped into a structure suitable for the frequency band (200 to 300 MHz). Also, the in-tank antenna 5 and the out-tank antenna 6 are set to the same receiving sensitivity.

Figure 1:
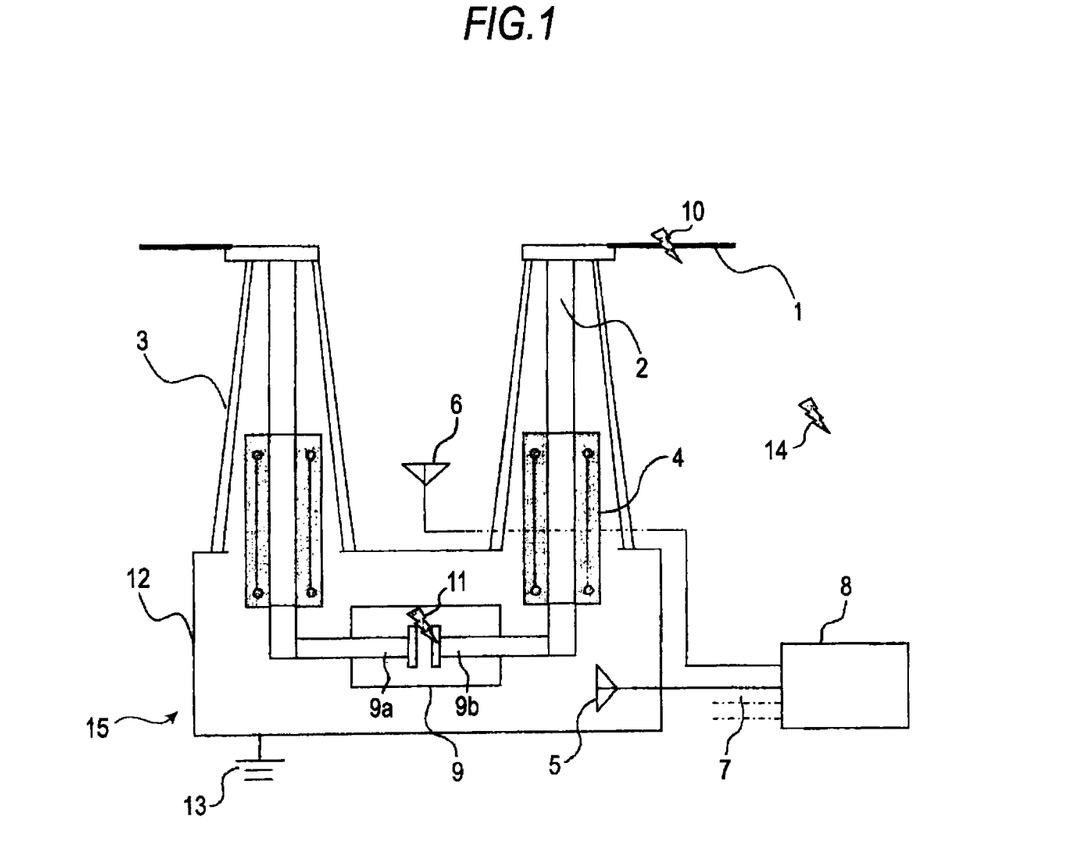
FIG. 1 is a schematic sectional side view of a vacuum circuit breaker including a vacuum monitoring device according to a first embodiment of the invention.
Figure 2:
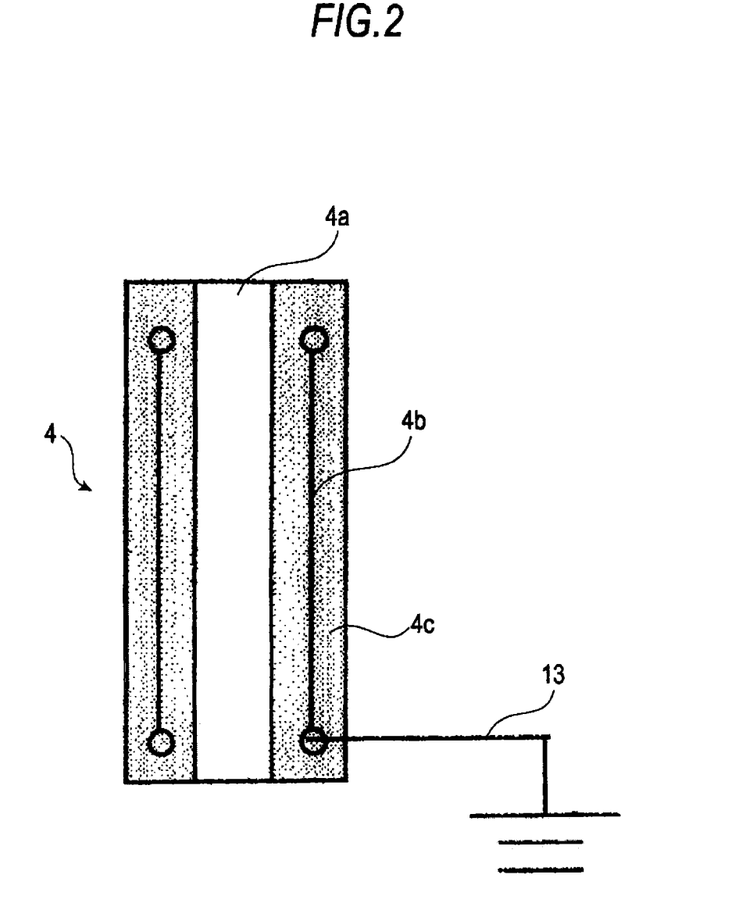
FIG. 2 is a schematic sectional side view of a bushing installed in the vacuum circuit breaker according to the first embodiment of the invention.
Figure 3:
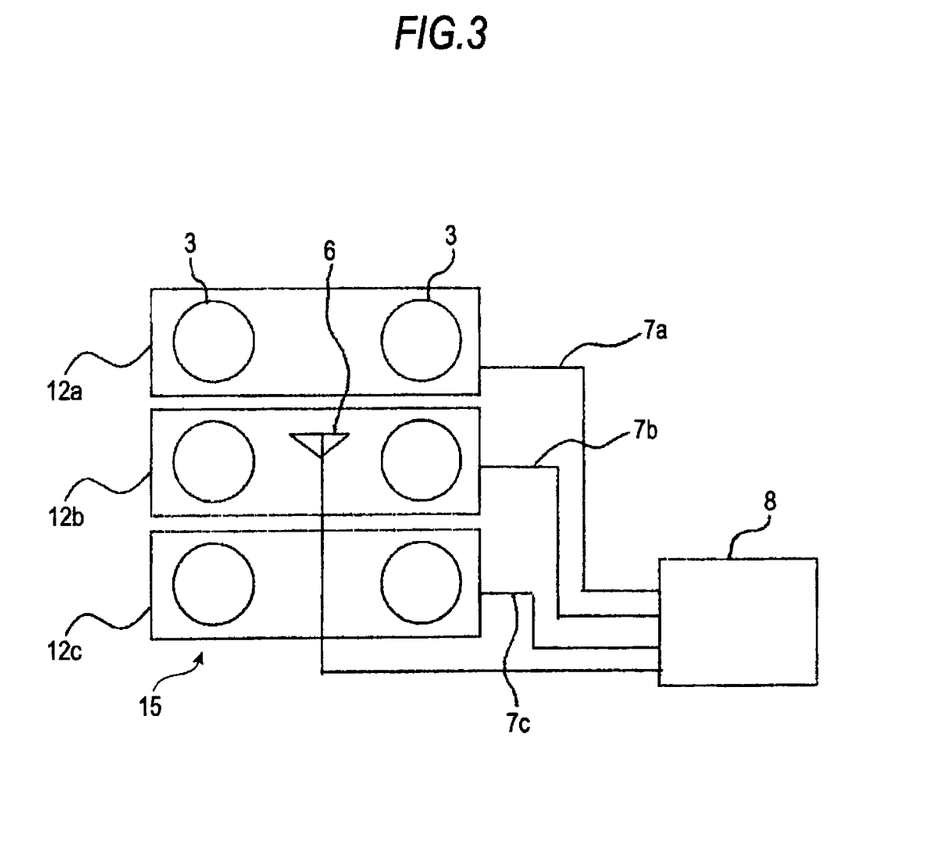
FIG. 3 is a schematic top view of the vacuum circuit breaker including the vacuum deterioration monitoring device according to the first embodiment of the invention.

FIG. 1 shows one phase of the vacuum circuit breaker, but in the case of three phases, an A phase, a B phase, and a C phase, three vacuum circuit breakers 15 of the type shown in FIG. 1 are installed side by side, as shown in FIG. 3. In this case, the three metal tanks are given signs 12a, 12b, and 12c for each respective phase, the in-tank antennas are given signs 5a, 5b, and 5c for each respective phase, and the outputs of the individual antennas are given signs 7a, 7b, and 7c for each respective phase. When it is not necessary to describe the phases separately, the metal tank, the in-tank antenna, and the antenna output are indicated by 12, 5, and 7 respectively.

FIG. 3 is a top view schematically showing vacuum circuit breakers of three phases, and the metal tanks 12a, 12b, and 12c, each of which includes a pair of porcelain tubes 3, are installed side by side. The outputs 7a, 7b, and 7c of the in-tank antennas installed in the respective metal tanks are input into the vacuum monitoring section 8. The out-tank antenna 6 is installed above the metal tank and in substantially the center of the connections of the porcelain tubes 3 and power lines 1, and the output of the out-tank antenna 6 is input into the vacuum deterioration monitoring section 8. In FIG. 3, the illustration of the power lines 1 is omitted.

Figure 4:
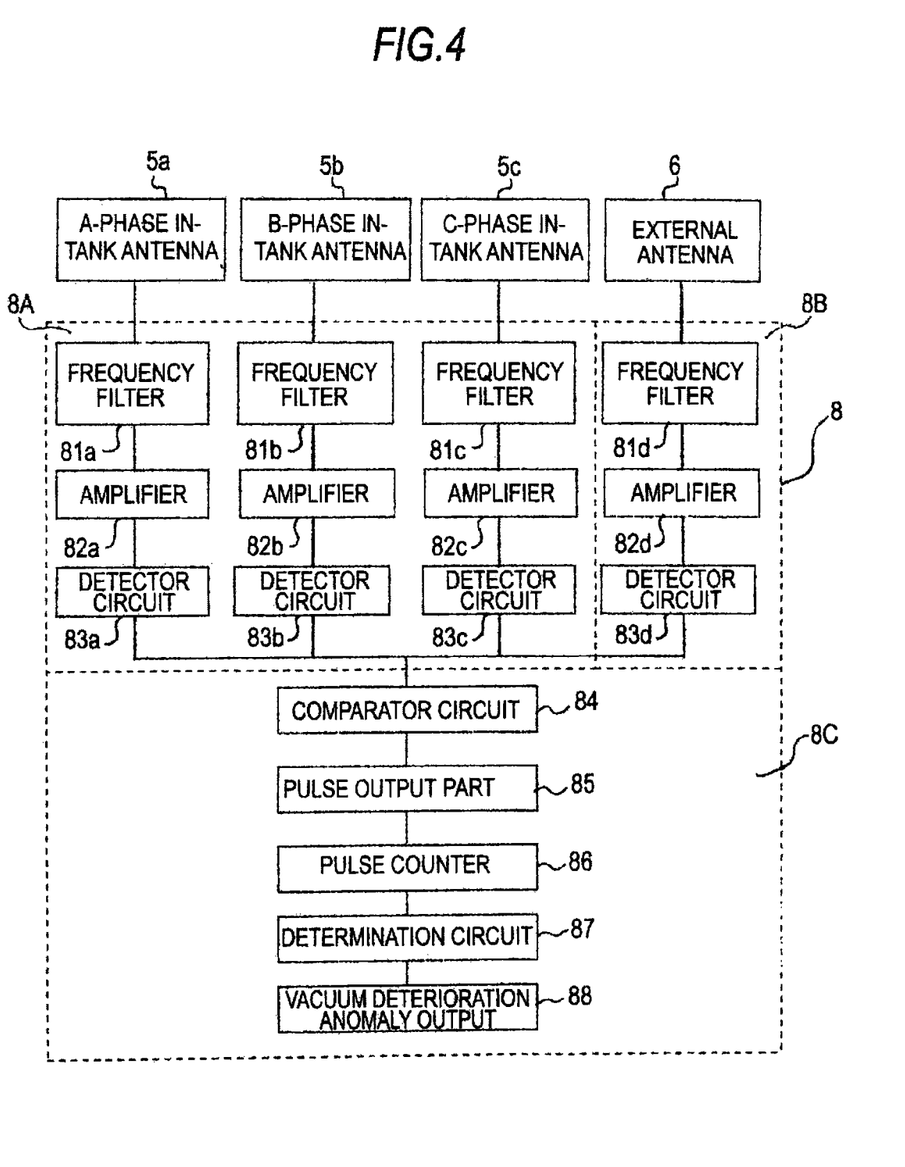
FIG. 4 is a block diagram showing a vacuum deterioration monitoring section of the vacuum monitoring device according to the first embodiment of the invention.

Next, a description will be given, using FIG. 4, of a configuration of the vacuum deterioration monitoring section 8. The vacuum deterioration monitoring section 8 is configured of a first detection portion 8A which detects received signals of the in-tank antennas 5 (the A-phase antenna, the B-phase antenna, and the C-phase antenna are denoted 5a, 5b, and 5c respectively), a second detection portion 8B which detects a received signal of the out-tank antenna 6, and a determination portion 8C which determines a vacuum deterioration from signals of the first and second detection portions 8A and 8B.

In the first detection portion 8A, the configurations of detection parts belonging one to each of the A phase, B phase, and C phase are the same. The first detection portion 8A is configured of frequency filters 81a, 81b, and 81c connected respectively to the A-phase in-tank antenna 5a, B-phase in-tank antenna 5b, and C-phase in-tank antenna 5c, amplifiers 82a, 82b, and 82c connected to the respective filters, and detector circuits 83a, 83b, and 83c connected to the respective amplifiers. The second detection portion 8B is configured of a frequency filter 81d connected to the out-tank antenna 6, an amplifier 82d connected to the filter, and a detector circuit 83d connected to the amplifier. The frequency filters 81a to 81d are band-pass filters whose passing frequency band is, for example, 200 to 300 MHz. The frequency band matches a frequency band, of an electromagnetic wave resulting from a partial discharge of the vacuum interrupter 9, which is intended to be detected by the in-tank antenna 5. The frequency band is not limited to 200 to 300 MHz, but may be set to, for example, 100 to 200 MHz.

The determination portion 8C is a portion which, upon receiving the signals from the first and second detection portions 8A and 8B, determines a vacuum deterioration of the vacuum interrupter, and the portion includes a comparator circuit 84 which compares signals obtained by the detector circuits 83a to 83d, a pulse output part 85 which, when it is determined by the comparator circuit 84 that an in-tank partial discharge is occurring, outputs this comparison result in the form of pulses, a pulse counter 86 which counts the pulses from the pulse output part 85, and a determination circuit 87 which detects the duration of the partial discharge from the number of pulse counts, determines whether or not the partial discharge results from a vacuum deterioration of the vacuum interrupter, and emits a vacuum deterioration anomaly output 88.

Figure 6:
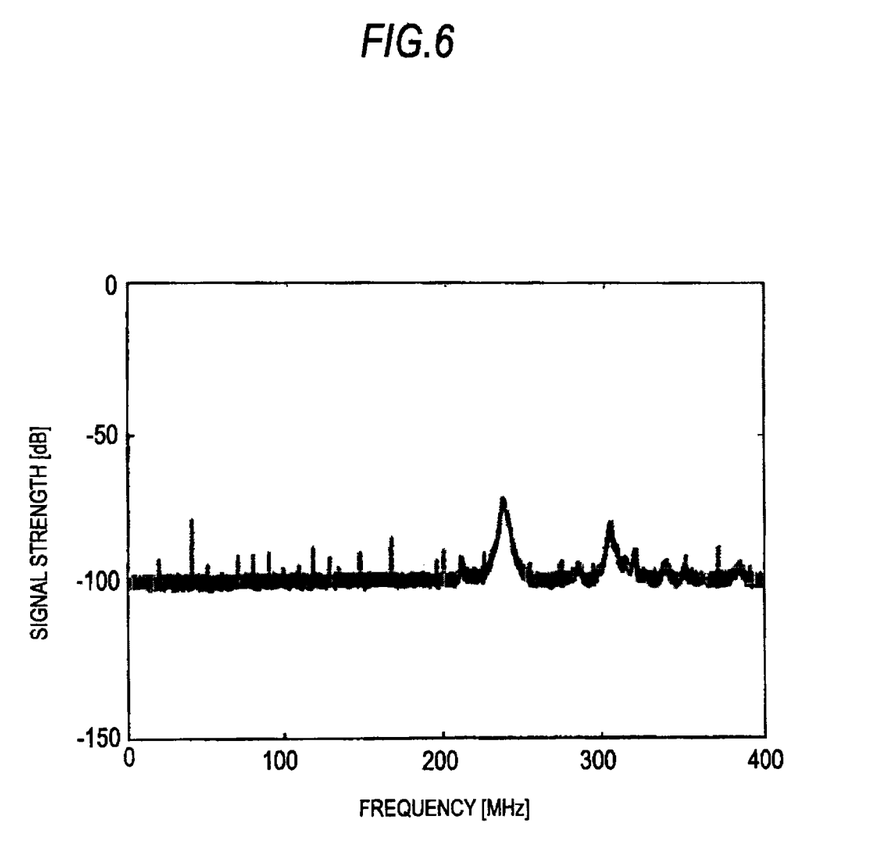
FIG. 6 is a chart showing a measurement result in a band of 200 to 300 MHz of an electromagnetic wave resulting from a partial discharge in a vacuum valve.

As the insulation performance in the vacuum interrupter 9 decreases when the degree of vacuum in the vacuum interrupter 9 deteriorates, a partial discharge 11 occurs mainly in the vicinity of the contacts 9a and 9b in the vacuum interrupter 9. An electromagnetic wave, resulting from the partial discharge 11 passes through the vacuum interrupter 9 and is detected by the in-tank antenna 5. FIG. 6 is a chart showing a result of the detection, by the in-tank antenna 5, of an electromagnetic wave of the partial discharge 11 occurring in the vacuum interrupter 9 when the vacuum interrupter 9 deteriorates in vacuum. This measurement result shows that, the frequency band being narrowed down to a range of 200 to 300 MHz using the band-pass filter, the partial discharge 11 in the vacuum interrupter 9 has a signal component of the same band.

Meanwhile, the electromagnetic wave of the partial discharge 11 occurring in the vacuum interrupter 9 also conducts to the external of the metal tank through the in-bushing conductor 4a and in-porcelain-tube conductor 2. As the bushing 4 functions as the low-pass filter owing to the internal shield 4b, as heretofore described, a signal of 100 MHz or less of the partial discharge 11 also easily conducts to the external of the metal tank and is also detected by the out-tank antenna 6. However, a signal of a frequency band (herein, 200 to 300 MHz) which is difficult to pass through the low-pass filter of the bushing 4, as the signal attenuates in the bushing 4 portion, hardly reaches the out-tank antenna 6, and an electromagnetic wave intensity detected by the out-tank antenna 6 is small compared with an electromagnetic wave intensity detected by the in-tank antenna 5.

Also, as noises intruding from the external of the metal tank, there are an external radiation noise 14 resulting from a broadcast wave and an external conduction noise 10 such that a noise generated in another unshown instrument connected to the vacuum circuit breaker 15 via the power line 1 conducts via the power line 1. The electromagnetic waves of the external conduction noise 10 and external radiation noise 14 are detected by the out-tank antenna 6, and also conduct into the metal tank 12 via the in-porcelain-tube conductor 2 and in-bushing conductor 4a. A signal of, for example, 100 MHz or less of the external noise also easily conducts into the metal tank and is also detected by the in-tank antenna 5. Meanwhile, a signal of a frequency band (herein, 200 to 300 MHz) which is difficult to pass through the low-pass filter of the bushing 4, as the signal attenuates in the bushing 4 portion, hardly reaches the in-tank antenna 5, and an electromagnetic wave intensity detected by the in-tank antenna 5 is small compared with an electromagnetic wave intensity detected by the out-tank antenna 6.

In the way heretofore described, the in-tank antenna output 7 of a noise received by the in-tank antenna 5 is applied to the first detection portion 8A of the vacuum deterioration monitoring section 8, and a noise received by the out-tank antenna 6 is applied directly to the second detection portion 8B of the vacuum deterioration monitoring section 8. Next, the signals detected by the first and second detection portions 8A and 8B are processed by the determination portion 8C.

Signals, of the signals received by the A-phase, B-phase, and C-phase in-tank antennas 5a, 5b, and 5c, which have only a specific frequency band (herein, 200 to 300 MHz) are extracted by the frequency filters 81a, 81b, and 81c which are band-pass filters. In the same way, signals, of the signals received by the out-tank antenna 6, which have only a specific frequency band (herein, 200 to 300 MHz) are extracted by the frequency filter 81d which is similarly a band-pass filter. The extracted signals are amplified by the amplifiers 82a, 82b, 82c, and 82d, and crest values are extracted by the detector circuits 83a, 83b, 83c, and 83d. Consequently, by adopting a configuration such that only electromagnetic wave signals with a specific frequency band (herein, 200 to 300 MHz) are taken out as output signals of the detector circuits 83a to 83d by the low-pass filter function of the bushing 4 and the frequency filters 81a to 81d, it is possible to specify whether an electromagnetic wave is generated in the metal tank or out of the metal tank, and when the generation is in the metal tank, specify the vacuum interrupter of which phase is the source of the generation, by using the comparator circuit 84 as in the following.

The crest values of noises extracted by the detector circuits 83a, 83b, 83c, and 83d are compared with each other in the comparator circuit 84 of the determination portion 8c. It is possible to distinguish between the sources of generation of noise electromagnetic waves by the comparison by the comparator circuit 84, for example, by comparing the sizes of the signals as in the following.

When an external noise is of the A phase:
 the output of the antenna 6>the antenna 5a>the antenna 5b, the antenna 5c
When external noises are of the three phases:
 the output of the antenna 6>the antenna 5a, the antenna 5b, the antenna 5c
When a partial discharge occurs in the A phase:
 the output of the antenna 5a>the antenna 6>the antenna 5b, the antenna 5c
When partial discharges occur in the A phase and B phase:
 the output of the antenna 5a, the output of the antenna 5b>the antenna 6>the antenna 5c

As it is possible to distinguish between the sizes of the outputs of the detector circuits 83a to 83d and thus specify the source of occurrence of a partial discharge in the metal tank, as above, the result of comparison of the electromagnetic wave intensities of partial discharges in the metal tanks is output as pulses from the output of the comparator circuit 84 by the pulse output part 85, and by counting the number of pulses in the pulse counter 86, the determination circuit 87 determines that there is a vacuum deterioration when the sustainability of discharge or the frequency of discharges exceeds a predetermined threshold value, and emits the vacuum deterioration anomaly output 88.

According to this embodiment, by detecting a partial discharge when the vacuum valve deteriorates in vacuum, it is possible to detect a vacuum deterioration of the vacuum valve, that is, the vacuum circuit breaker, and by comparing the outputs received by the in-and out-tank antennas, it is possible to prevent the vacuum monitoring device from failing to detect and function properly due to an exogenous noise. Furthermore, a frequency band, which is difficult to pass through the bushing portion, is used as a detection frequency band, thereby making it easy to compare the signal strengths in and out of the metal tank, and it is thus possible to obtain a vacuum monitoring device with great accuracy and high reliability.

Embodiment 2

Figure 5:
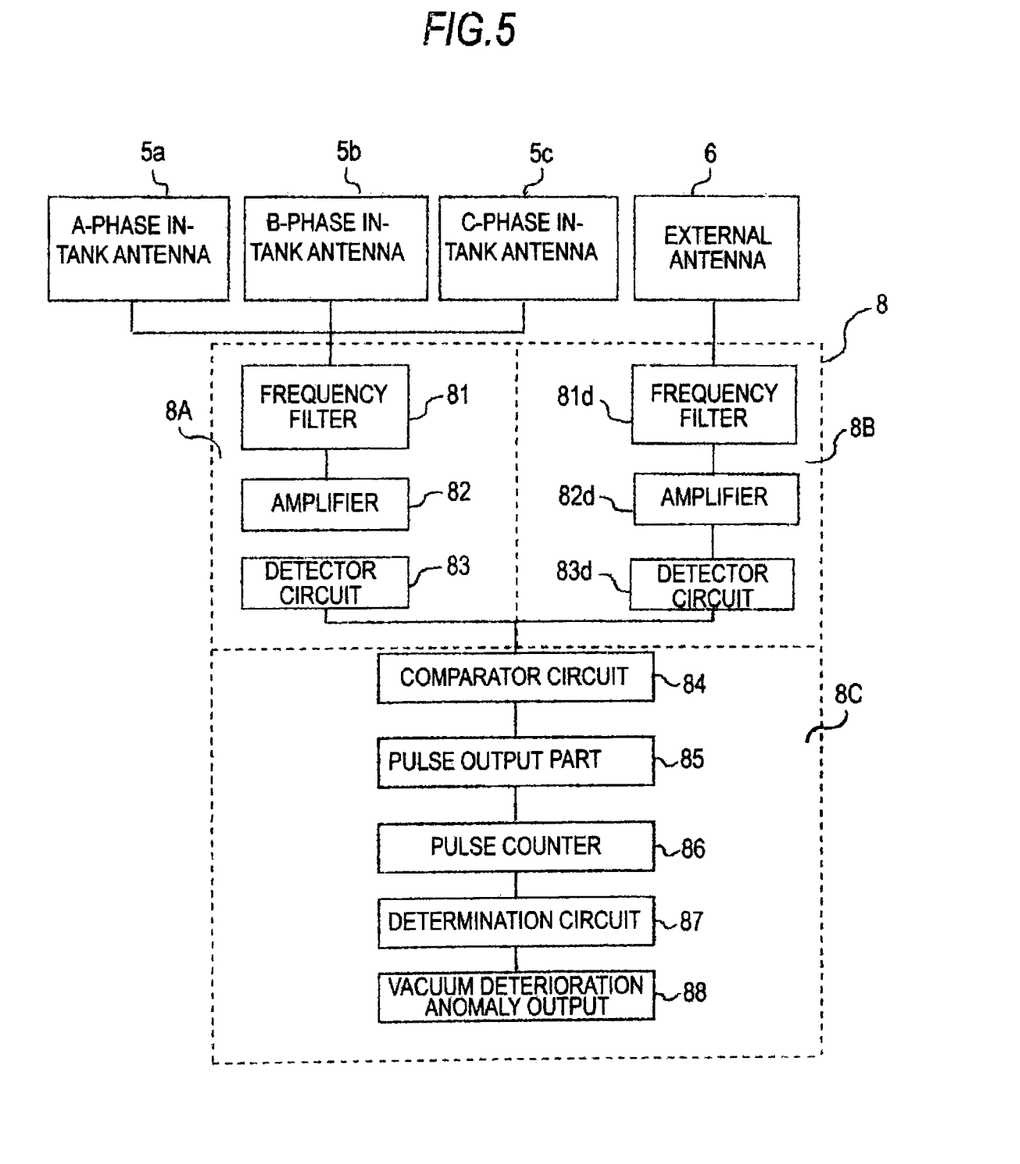
FIG. 5 is a block diagram showing a vacuum deterioration monitoring section of a vacuum deterioration monitoring device according to a second embodiment of the invention.

A vacuum monitoring device according to a second embodiment is different in the following points from that of the first embodiment. In the first embodiment, as the in-tank antenna outputs 7a, 7b, and 7c of the individual phases are separately compared by the comparator circuit, it is possible to determine in which phase a vacuum deterioration occurs, but the frequency filter, the amplifier, and the detector circuit are necessary for each phase, thus leading to an increase in cost. In the second embodiment, as the case in which it is not necessary to specify a phase in which an anomaly occurs, a configuration is such that the first detection portion 8A is configured of one frequency filter 81, one amplifier 82, and one detector circuit 83, as shown in FIG. 5, and that the in-tank antenna outputs of the individual phases are thus collectively applied to the first detection portion 8A. Other configurations are the same as in the first embodiment.

According to the configuration of the second embodiment, it is not possible to specify a phase in which an anomaly occurs, but the circuit configuration is simple. Also, the vacuum circuit breaker of FIG. 3 is of a configuration wherein the metal tanks are installed one for each phase, but the second embodiment is effective even when adopting a configuration wherein the main circuits of three phases are disposed in one metal tank, thus achieving a further simplification in configuration. In the case of the second embodiment too, it is possible to distinguish between an exogenous noise out of the metal tank and a discharge in the metal tank in the same way as in the first embodiment.

The invention has heretofore been described based on the embodiments, but the invention is such that it is possible to combine the embodiments and appropriately modify or omit each or either of the embodiments without departing from the scope of the invention.

REFERENCE SIGNS LIST

1 Power line
2 In-porcelain-tube conductor
3 Porcelain tube
4 Bushing
4a In-bushing conductor
4b Internal shield
4c Insulator
5 (5a, 5b, 5c) First antenna (in-tank antenna)
6 Second antenna (out-tank antenna)
7 (7a, 7b, 7c) First antenna output
8 Vacuum deterioration monitoring section
8A First detection portion
8B Second detection portion
8C Determination portion
9 Vacuum interrupter
9a, 9b Contact
10 External conduction noise
11 Partial discharge
12 (12a, 12b, 12c) Metal tank
13 Ground
14 External radiation noise
15 Vacuum circuit breaker
81, 81a to 81d Frequency filter
82, 82a to 82d Amplifier
83, 83a to 83d Detector circuit
84 Comparator circuit
85 Pulse output part
86 Pulse counter
87 Determination circuit
88 Vacuum deterioration anomaly output

The invention claimed is:
1. A vacuum monitoring device, which monitors a vacuum deterioration of a vacuum valve, of a metal tank type vacuum circuit breaker which includes the vacuum valve inside a metal tank and has a connecting line of the vacuum valve led out to the external of the metal tank through a bushing, the bushing having an internal shield having a low-pass function, comprising:
a first antenna installed inside the metal tank;
a second antenna installed outside the metal tank;
a first detection portion which measures the intensity of an electromagnetic wave, resulting from a partial discharge of the vacuum valve, which is detected by the first antenna;
a second detection portion which measures the intensity of an electromagnetic wave, resulting from a noise out of the metal tank, which is detected by the second antenna; and
a determination portion which determines a vacuum deterioration of the vacuum valve by comparing the intensity of the electromagnetic wave detected by the first detection portion and the intensity of the electromagnetic wave detected by the second detection portion, the device being characterized in that
the first and second detection portions include frequency filters which pass a frequency band, of electromagnetic waves resulting from discharges occurring when the vacuum valve deteriorates in vacuum, which is attenuated by the internal shield.

2. The vacuum monitoring device according to claim 1, wherein
the determination portion determines that there is an external noise when the intensity of the electromagnetic wave detected by the first detection portion is smaller than the intensity of the electromagnetic wave detected by the second detection portion, and determines that there is a vacuum deterioration due to a partial discharge of the vacuum valve when the intensity of the electromagnetic wave detected by the first detection portion is larger than the intensity of the electromagnetic wave detected by the second detection portion.

3. The vacuum monitoring device according to claim 1, characterized in that
the metal tank type vacuum circuit breakers are installed side by side for three phases.

4. The vacuum monitoring device according to claim 3, characterized in that
the first detection portion collectively measures the intensities of electromagnetic waves received one for each phase by the first antenna.

5. The vacuum monitoring device according to claim 1, characterized in that
the first and second antennas have characteristics suitable for receiving a frequency band, of electromagnetic waves resulting from discharges occurring when the vacuum valve deteriorates in vacuum, which is attenuated by the low-pass filter function of the bushing.

6. The vacuum monitoring device according to claim 1, characterized in that
the first and second detection portions include detector circuits which detect the crest values of the received electromagnetic waves.

7. The vacuum monitoring device according to claim 1, characterized in that
the determination portion includes a comparator circuit which compares the intensity of the electromagnetic wave detected by the first detection portion and the intensity of the electromagnetic wave detected by the second detection portion, a pulse output part and a pulse counter which count outputs of the comparator circuit as pulses, and a determination circuit which determines that there is a vacuum deterioration of the vacuum valve when an output of the pulse counter exceeds a threshold value.

8. The vacuum monitoring device according to claim 3, characterized in that the second antenna is installed above the metal tank and in a position in which electromagnetic waves resulting from noises from a power line connected to the bushing are substantially equal in receiving sensitivity to each other.

* * * * *